(12) United States Patent
Condo (10) Patent No.: US 7,614,871 B2
(45) Date of Patent: Nov. 10, 2009

(54) ROTARY VALVE ASSEMBLY FOR AN INJECTION NOZZLE

(75) Inventor: Gerri Condo, Hillsburgh (CA)

(73) Assignee: Husky Injection Molding Systems Ltd, Bolton ON (CA)

( * ) Notice: Subject to any disclaimer, the term of this patent is extended or adjusted under 35 U.S.C. 154(b) by 189 days.

(21) Appl. No.: 11/776,626

(22) Filed: Jul. 12, 2007

(65) Prior Publication Data

US 2009/0017153 A1    Jan. 15, 2009

(51) Int. Cl.
*B29C 45/23* (2006.01)
(52) U.S. Cl. .................................. 425/562; 425/564
(58) Field of Classification Search .................. 425/562, 425/564, 567, 568
See application file for complete search history.

(56) References Cited

U.S. PATENT DOCUMENTS

| | | | |
|---|---|---|---|
| 4,054,273 A | 10/1977 | Neuman | |
| 4,140,238 A | 2/1979 | Dawson | |
| 4,632,652 A * | 12/1986 | Farrell | 425/137 |
| 4,983,117 A | 1/1991 | Von Buren et al. | |
| 5,035,605 A * | 7/1991 | Dinerman et al. | 425/564 |
| 5,433,594 A * | 7/1995 | Hehl | 425/192 R |
| 5,460,508 A | 10/1995 | Ohno et al. | |

FOREIGN PATENT DOCUMENTS

| | | |
|---|---|---|
| EP | 0494304 A1 | 7/1992 |
| EP | 0494304 B1 | 9/1994 |
| JP | 57120407 A2 | 7/1982 |
| JP | 9099460 A | 4/1997 |
| JP | 9123216 A | 5/1997 |
| JP | 09132218 A | 5/1997 |

OTHER PUBLICATIONS

International Search Report, 3 pages.
International Search Report, 3 pages, 1990.

* cited by examiner

*Primary Examiner*—Tim Heitbrink (57) ABSTRACT

A rotary valve assembly for an injection unit is provided, having a valve body, defining a melt channel for a working fluid. At least one end cap is mounted to the valve body, the valve body and the at least one end cap cooperatively defining a valve seat intersecting the melt channel in a generally traverse direction, the valve seat having a wider portion and a narrower portion. A spool defines an orifice, the spool being rotatably mounted within the valve seat, and is movable between an open position where the orifice is aligned with the melt channel and a closed position where the orifice is misaligned with the melt channel.

23 Claims, 12 Drawing Sheets

ROTARY VALVE ASSEMBLY FOR AN INJECTION NOZZLE

FIELD OF INVENTION

The present invention generally relates to molding systems; more specifically, the present invention relates to rotary valve assemblies for the injection nozzle for the molding system.

BACKGROUND OF INVENTION

The injection molding process usually comprises preparing a polymeric material in an injection unit of an injection molding machine, injecting the now-molten material under pressure into a closed and clamped mold that is water cooled, solidifying the material in its molded shape, opening the mold and ejecting the part before beginning the next cycle. The polymeric material typically is supplied to the injection unit from a hopper in the form of pellets or powder. The injection unit transforms the solid polymeric material into a molten material, typically using a feed screw, which is then injected into a hot runner or other molding system under pressure from the feed screw or a plunger unit. A shut off valve assembly is typically provided to stop and start the flow of molten material from the barrel to the molding system.

Numerous types of valve assemblies can be used, including sliding piston valves and rotary valves. An example of a prior art sliding piston valve assembly for an injection unit can be found in U.S. Pat. No. 4,140,238 to Dawson (published Feb. 2, 1979). An example of a prior art rotary valve assembly for an injection unit can be found in U.S. Pat. No. 4,054,273 to Neuman (published Oct. 18, 1977).

Efforts have been made to improve the rotary valve assembly. European patent 0 494 304 B1, entitled "Rotary Valve of Injection Molding Machine" to YOKOTA, Akira et al. (published on Sep. 7, 1994) teaches a rotary valve assembly of an injection molding machine provided with a cylindrical valve chamber formed in the flow passage in which molten resin is filled under pressure and through which molten resin flows from the screw side to the nozzle side, wherein a cylindrical valve body having a through hole radially piercing through the body for ensuring unobstructed flow through the flow passage so that the through hole may agree with the axial line of the cylindrical valve chamber is fitted into the valve chamber slidably around the axial line and circumferential grooves are formed in the circumferential direction on both sides of the through hole and located along the axial line of the cylindrical valve body on the peripheral surface thereof so that even a small driving torque can actuate the cylindrical valve body.

Japanese patent 09132218A, entitled "Shutoff Nozzle for Injection Molding Machine" to MASATAKA et al (published on May 13, 1997) teaches: In an extrusion molding machine shut-off nozzle made capable of rotation between a position in which a molten resin passage is connected and a position in which the molten resin passage is cut off, and a housing is provided at some position along the nozzle having the molten resin passage whereby molten resin is fed to a metal mold from an extrusion molding machine, with rotary means provided at the end of a cylindrical rotary valve that has a through-hole in the interior of said housing and is freely rotatably inserted; a pressure reducing valve that temporarily admits molten resin left on a hot runner prior to commencement of suck-back is arranged in a direction intersecting the nozzle.

SUMMARY OF INVENTION

According to a first broad aspect of the present invention, there is provided a rotary valve assembly for an injection unit, comprising:
  a valve body, defining a melt channel for a working fluid;
  at least one end cap, mounted to the valve body, the valve body and the at least one end cap cooperatively defining a valve seat intersecting the melt channel in a generally traverse direction, the valve seat having a wider portion and a narrower portion; and
  a spool, defining an orifice, the spool being rotatably mounted within the valve seat, and movable between an open position where the orifice is aligned with the melt channel for expression of the working fluid through the melt channel and a closed position where the orifice is misaligned with the melt channel to prevent the expression of the working fluid through the melt channel.

DETAILED DESCRIPTION OF DRAWINGS

A better understanding of the non-limiting embodiments of the present invention (including alternatives and/or variations thereof) may be obtained with reference to the detailed description of the non-limiting embodiments of the present invention along with the following drawings, in which.

DETAILED DESCRIPTION OF THE NON-LIMITING EMBODIMENTS

Referring now to FIGS. 1-4, an injection unit for a molding system is shown generally at 20, in accordance with a first non-limiting embodiment. The injection unit 20 includes an extrusion barrel 22 adapted to receive a screw (not shown), a shut-off head 24 closing off the end of extrusion barrel 22, and a nozzle 26, all coaxially aligned. A melt channel 28 is defined between them, extending through barrel 22, shut-off head 24 and nozzle 26. A working fluid, typically a molten material such as a PET resin is expressed through melt channel 28 from barrel 22, through shut-off head 24, and then exits through an outlet 29 on nozzle 26.

A rotary valve assembly 30 is provided that is operably movable between an "open" position, where the molten resin is able to flow freely through melt channel 28 and exit through the outlet 29, and a "closed position", where the molten resin is blocked from exiting outlet 29. Rotary valve assembly 30 includes shut-off head 24, which defines a valve body 32. An outer bore 34 is defined within valve body 32 that bisects melt channel 28 in a generally traverse direction.

A pair of end caps 38 are located partially within outer bore 34 on opposing sides of valve body 32. Each end cap 38 includes a cylindrical insert portion 40, which extends into outer bore 34. A flange portion 46 on each of the end caps 38 limits the distance that the end cap 38 can be inserted into bore 34. Fasteners 50 are used to securely mount the end caps 38 to valve body 32, and to prevent rotation of the end caps 38. An extension portion 52 on each of the end caps 38 is a hollow cylinder on the side of flange portion 46 opposite insert portion 40. An inner bore 48, having a smaller diameter than outer bore 34, extends through the centre of end cap 38, making each inner bore 48 concentric with outer bore 34.

The outer bore 34 and the inner bore 48 in each end cap 38 cooperate to define a valve seat 36. The portion of outer bore 34 between the two insert portions 40 defines a wider portion 42 of valve seat 36, and each inner bore 48 defines a narrower portion 44 of the valve seat 36. The wider portion 42 is preferably located within the centre of valve body 32 so that melt channel 28 continues on opposing sides of wider portion 42. With the end caps 38 mounted to the sides of valve body 32, in the presently-illustrated embodiment, each of the two inner bores 48 is longer than outer bore 34. However, it is also contemplated that inner bores 48 could be sized longer or shorter than outer bore 34.

A spool 54 is rotatably located within valve seat 36. Spool 54 includes a thicker portion, namely centre portion 58 that is seated within wider portion 42. On opposing sides of centre portion 58 are thinner portions coaxially aligned with the centre portion 58, namely end portions 60, each of which is seated within an inner bore 48. A step 64 is provided between centre portion 58 and each end portion 60. For example, a spool 54 could have a diameter of 54 mm in the centre portion 58, and a diameter of 35 mm in each end portion 60, reducing the total surface area of spool 54 over a continuous-diameter spool 54 having the diameter of centre portion 58.

An orifice 70 is defined in centre portion 58. When spool 54 is in the open position, orifice 70 is aligned to be coaxial with melt channel 28, permitting the throughput of molten material. When spool 54 is in the closed position, orifice 70 is rotated away from melt channel 28 so that a land 72 on spool 54 (FIG. 2) prevents the molten material from flowing. Preferably, each of the end portions 60 extends fully through their respective inner bores 48, and past an outside edge 56 of the valve seat 36. The two ends 66 of spool 54 are adapted to be attached to an actuator arm 68. Movement of the actuator arm 68 by an actuator (not shown) moves spool 54 between the open and closed positions. While the presently-illustrated embodiment shows a spool 54 having a pair of end portions 60 extending beyond outside edges 56, it is contemplated that a spool 54 could be provided where only one end portion 60 or neither extends past outside edge 56.

Figure 4:
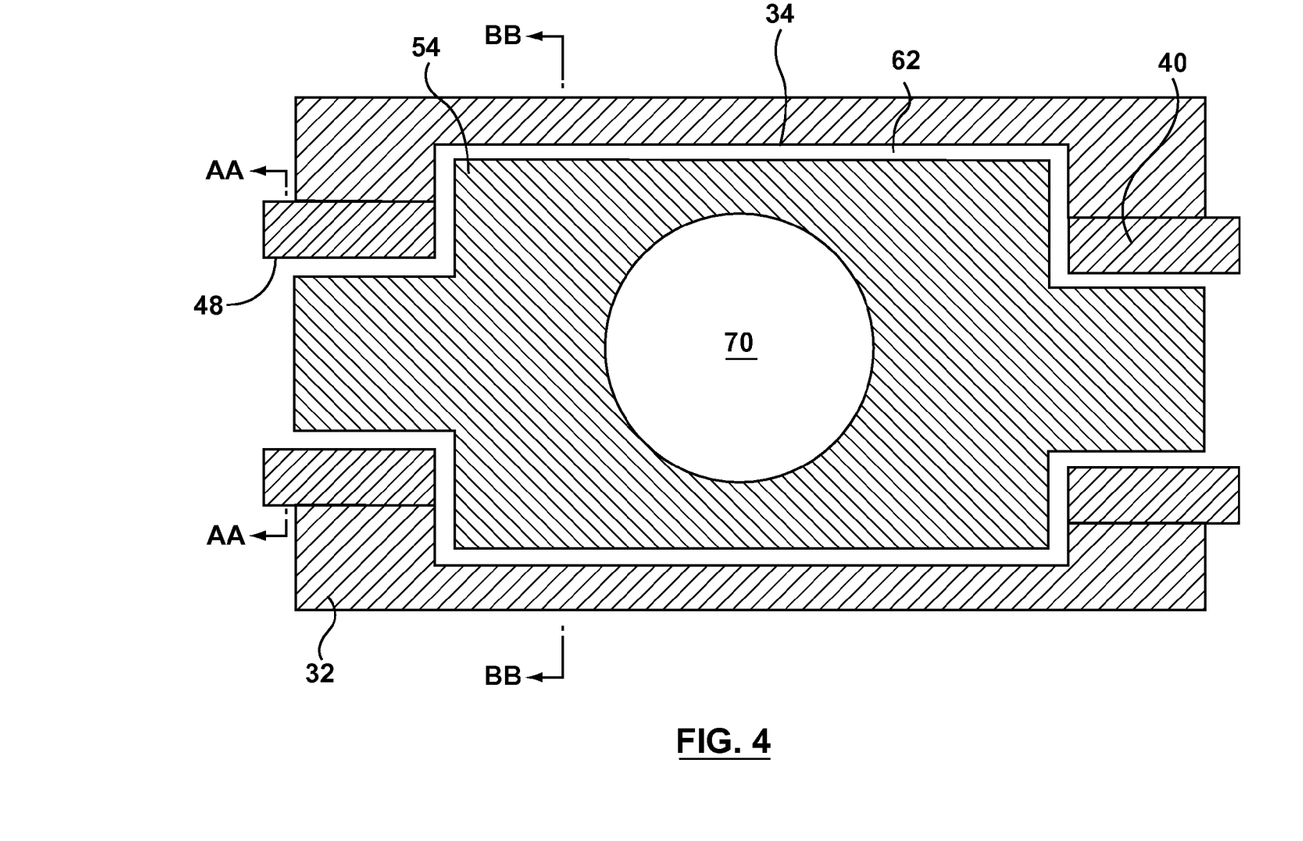
FIG. 4 shows a simplified schematic front cross-sectional view of the rotary valve assembly shown in FIG. 3.
Figure 5A:
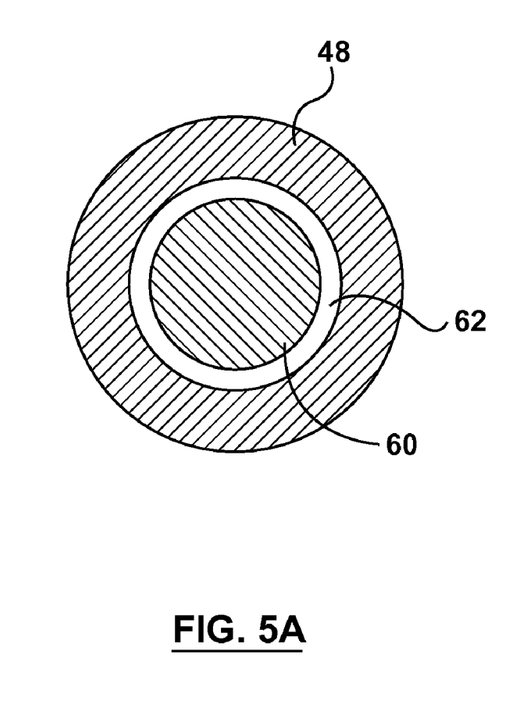
FIGS. 5A and 5B show simplified schematic side cross-sectional views of the rotary valve assembly shown in FIG. 3, taken along lines AA and BB respectively.
Figure 5B:
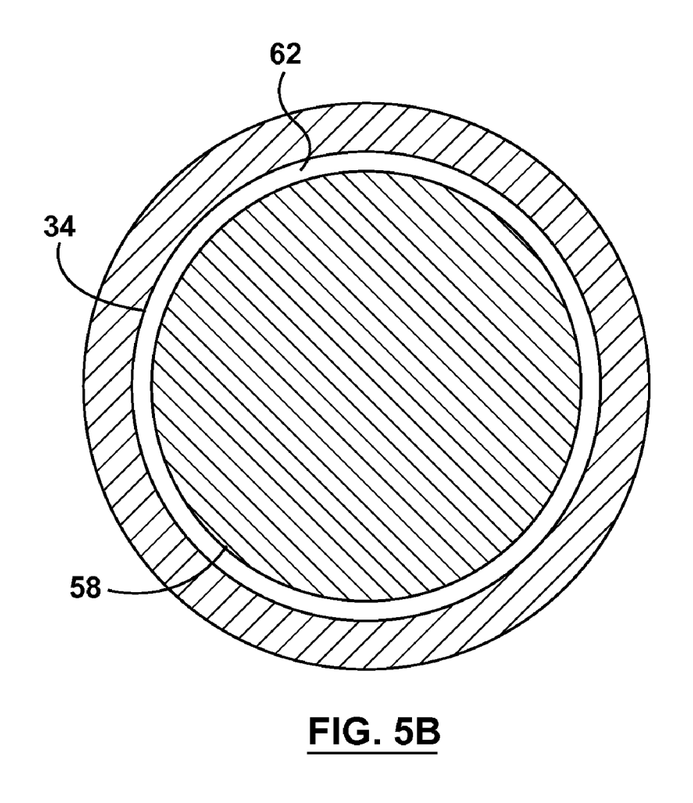

Spool 54 is sized so that it can rotate freely within valve seat 36. As is best seen in FIGS. 4, 5A and 5B, a clearance gap 62 is provided between the sidewall of spool 54 and the adjacent portion of outer bore 34 or inner bore 48, making it easier for an actuator (not shown) to open or close rotary valve assembly 30. In FIGS. 4, 5A and 5B the size of clearance gap 62 is exaggerated for the purpose of clarity. With some molten materials, clearance gap 62 allows the molten material to lubricate between parts, reducing the force required for actuation of the valve assembly. However, leakage of the molten material along clearance gap 62 and out through outside edge 56 remains a constant issue. Wider clearance gaps (for example, 0.02 to 0.03 mm) reduce component wear and actuation forces. Tighter clearance gaps (for example, 0.01 to 0.02 mm) reduce leakage but can result in greater component wear and slower cycle times between the open and closed position. Furthermore, using a tighter clearance gap 62 increases the heat to volume ratio of the resin in the clearance gap 62, potentially burning the molten material in this area. Carbonized resin gradually accumulates in clearance gap 62, adhering to the surrounding surfaces of valve seat 36, and increases system friction, resulting in degraded performance or component seizure.

In the presently-illustrated embodiment, a clearance gap 62 is provided between the sidewall of spool 54 and the adjacent portion of inner bore 48 (FIG. 5A) or outer bore 34 (FIG. 5B). Since the annular cross-sectional area of the clearance gap 62 between the inner bore 48 and the spool 60 (FIG. 5A) is less than the annular cross-sectional area of the clearance gap 62 between the outer bore 34 and the spool 60 (FIG. 5B), leakage is reduced compared to an assembly having a constant diameter spool sized to fit the centre portion 58 (not shown).

Figure 1:
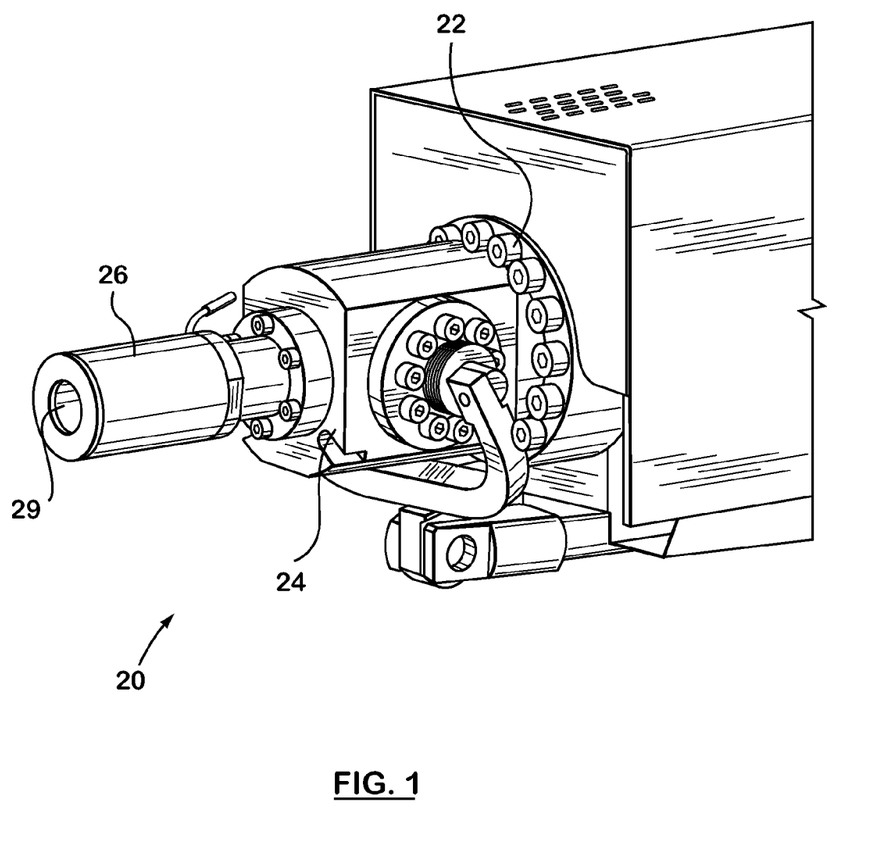
FIG. 1 shows a perspective view of a portion of an injection unit for a molding system in accordance with a first non-limiting embodiment of the invention.
Figure 2:
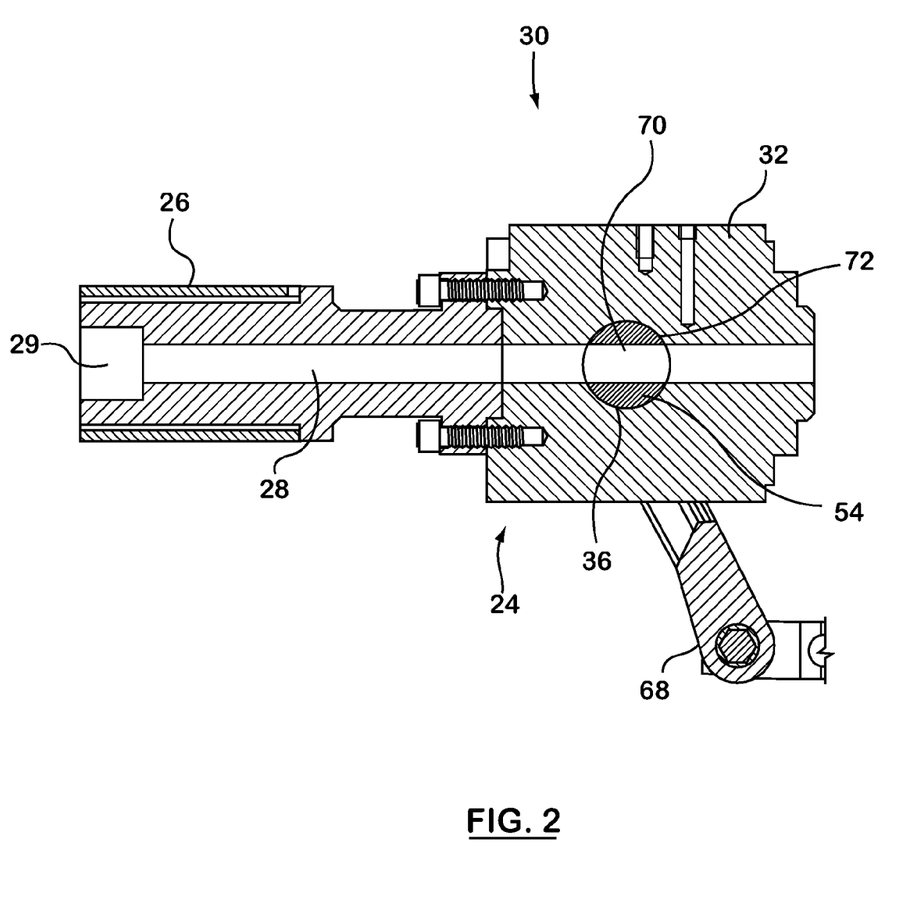
FIG. 2 shows a side cross-sectional view of the injection unit shown in FIG. 1.
Figure 3:
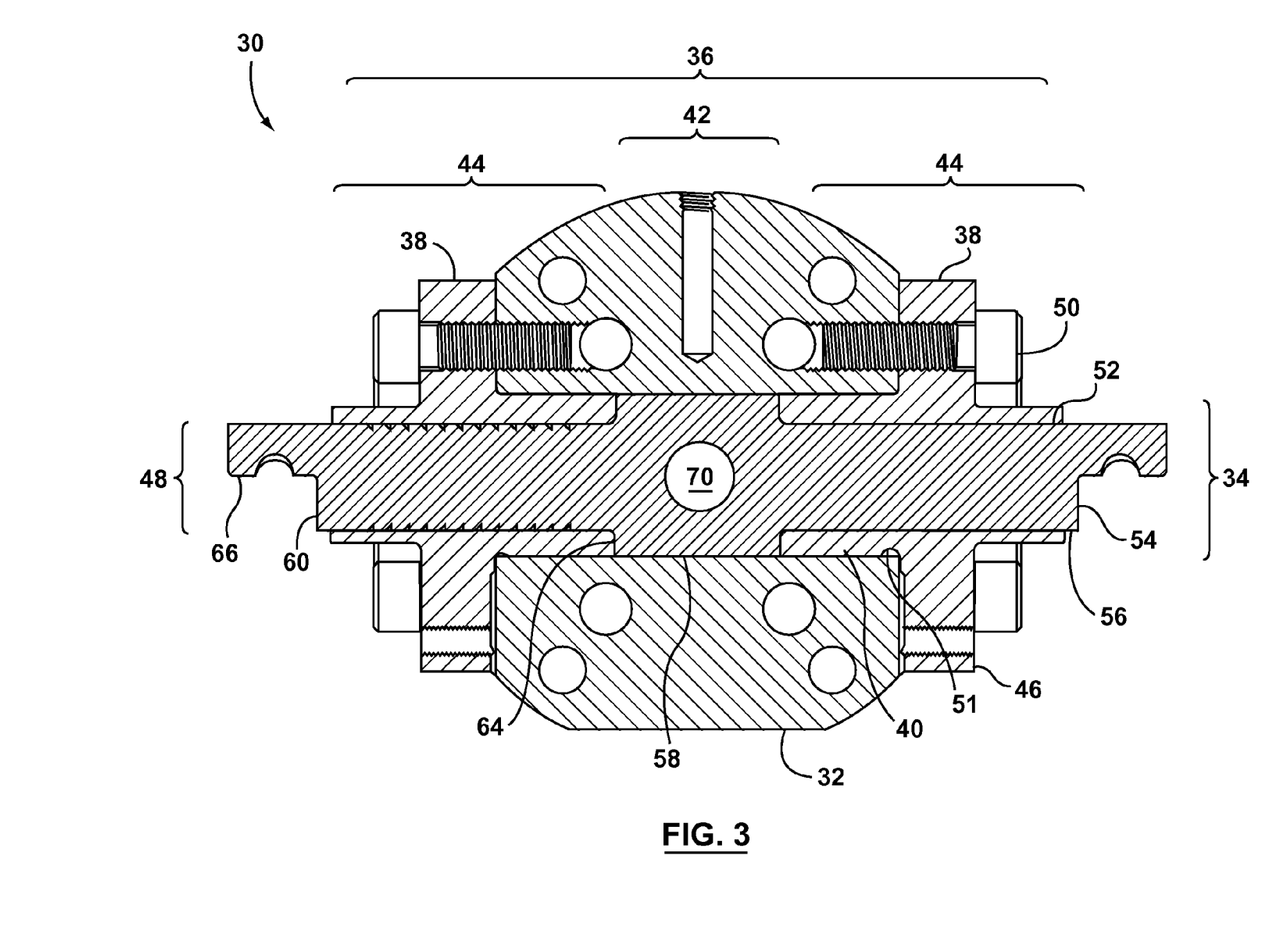
FIG. 3 shows a front cross-sectional view of a rotary valve assembly for the injection unit shown in FIG. 1.

Additionally, pressure in the weeping molten material decreases the further it travels orthogonally from orifice 70 (FIG. 3). Since the length of the opposing sealing surfaces on spool 54 and valve seat 36 (along the rotational axis) is extended past the dimensions of the valve body 32 by the end caps 38 and end portions 60, leakage of molten material past outside edge 56 is further reduced. Given the reduced leakage effected by the extended sealing surfaces and reduced annular cross-sectional area, a wider clearance gap 62 can be tolerated than with a continuous diameter spool 54 sized to fit centre portion 58.

To assemble rotary valve assembly 30, one of the end caps 38 is first removed. Then, the spool 54 is inserted into valve body 32 with the leading end portion 60 slid through the inner bore 48 on the remaining end cap 38. Once in place, the detached end cap 38 can be re-mounted, and secured tightly by fasteners 50. Spool 54 is constrained from non-rotational movement.

Figure 6A:
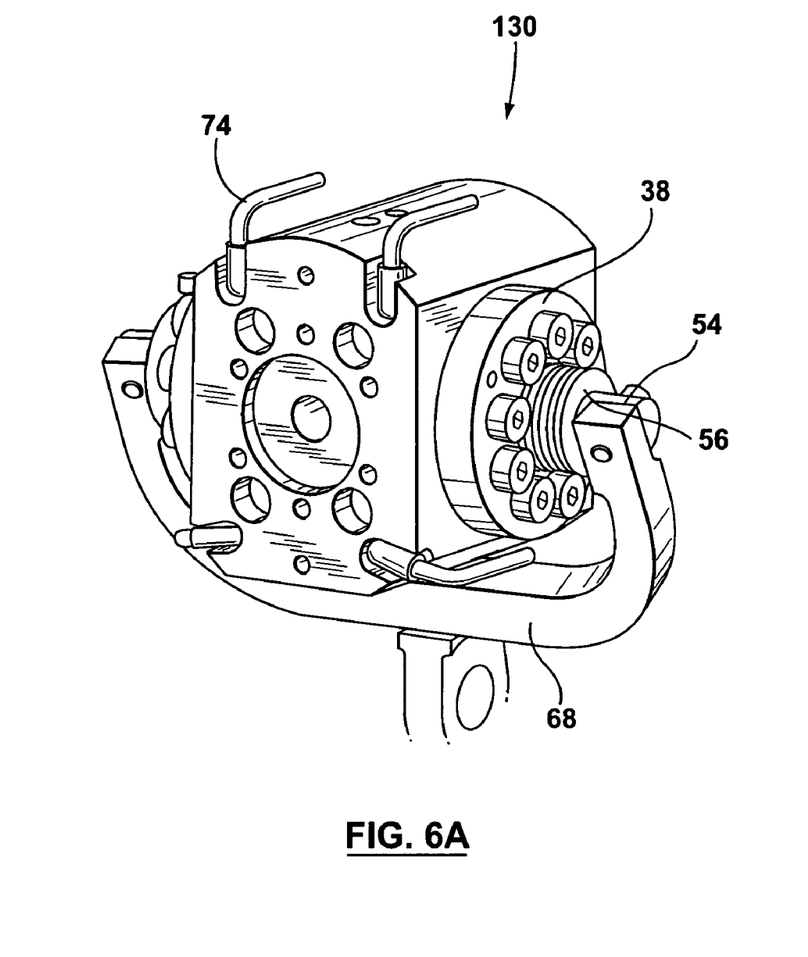
FIGS. 6A and 6B show opposing perspective views of a rotary valve assembly in accordance with a second non-limiting embodiment of the invention.
Figure 6B:
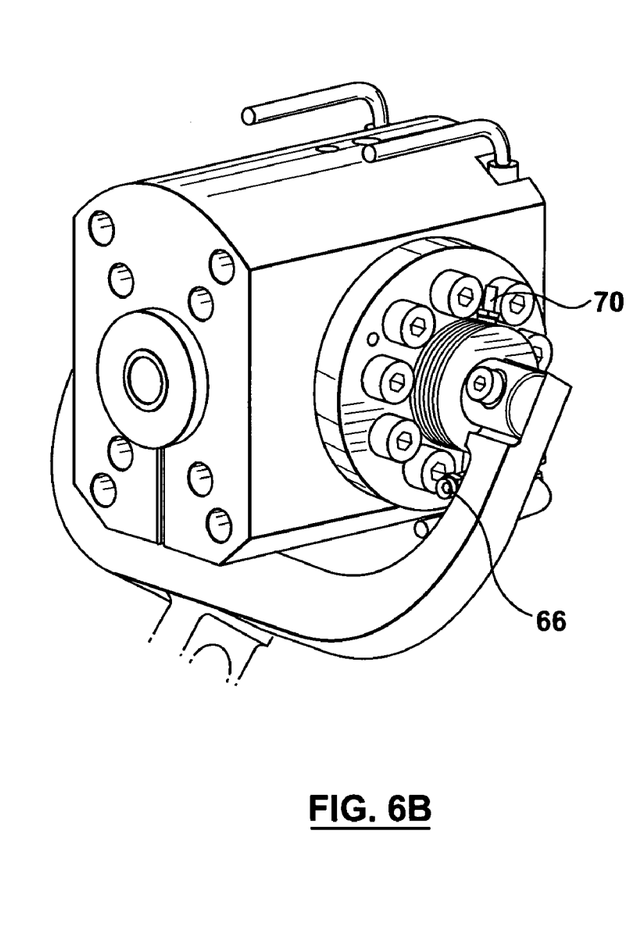

Referring now to FIGS. 6A and 6B, another non-limiting embodiment of the invention is shown generally at 130. Rotary valve assembly 130 includes heating elements 74 (heating cartridges in the presently-illustrated embodiment) that are distributed around valve body 32 to maintain the temperature of the molten material. The heating elements 74 are radially distributed around melt channel 28, and located away from the sealing surfaces around the end portions 60 so that the weeping molten material is as cool as possible as it approaches the outside edges 56.

Figure 7:
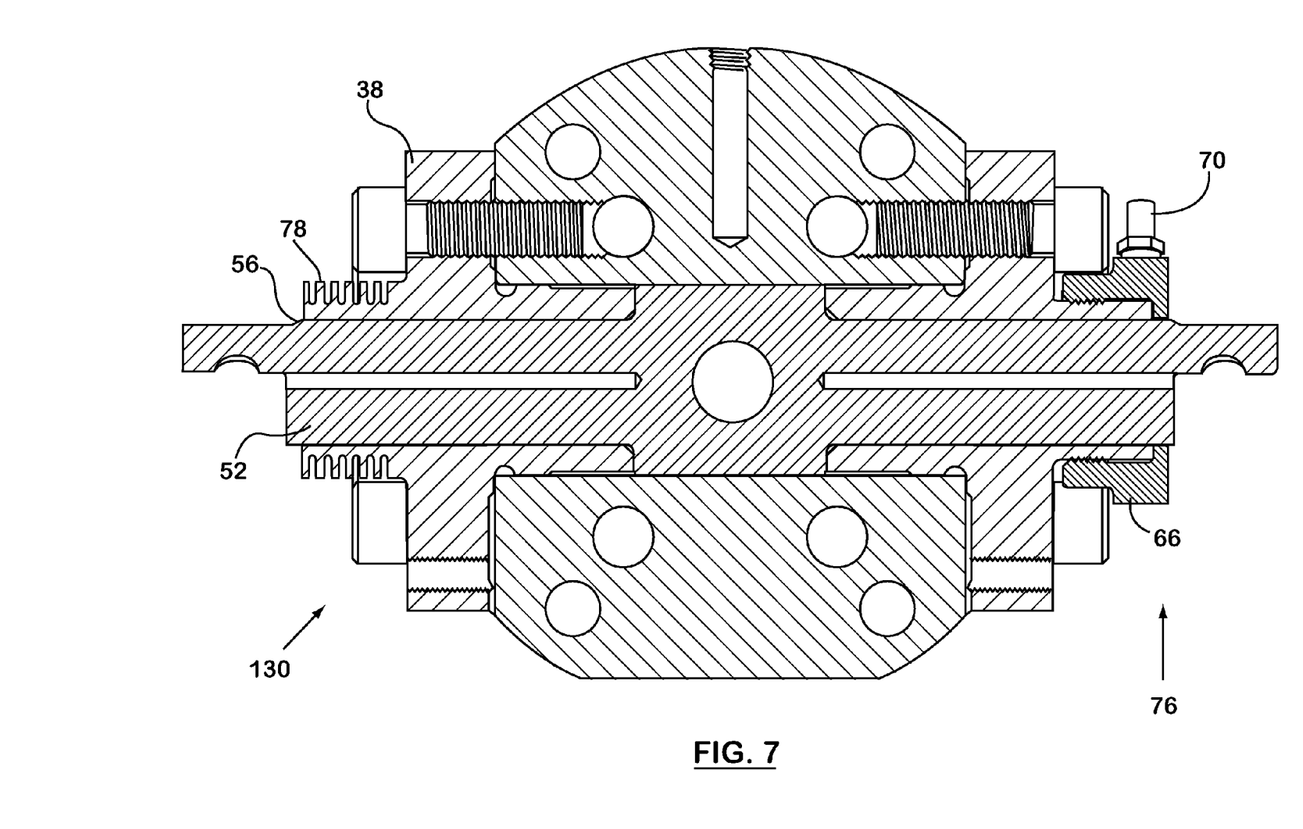
FIG. 7 shows a front cross-sectional view of a rotary valve assembly shown in FIGS. 6A and 6B.

Referring additionally to FIG. 7, cooling elements 76 are provided to cool the end portions 60 near the end of inner bores 48 using either forced convection or natural convection. For example, an air inlet 66 is operable to receive a pressurized air flow from a hose (not shown). The forced air is circulated around cooling channel (not shown), and the exhaust air directed out through air outlet 70. Alternatively, cooling elements 76 use a closed-loop system using water or another cooling medium (not depicted). A passive cooling element, namely a heat sink 78 can also be provided. In the embodiment illustrated in FIGS. 5 and 6, the heat sink 78 is formed in the extension portion 52 of one of the end caps 38. In both embodiments, cooling elements 76 increase the viscosity of the weeping molten material as it approaches the outside edges 56, thereby reducing leakage flow.

Figure 8:
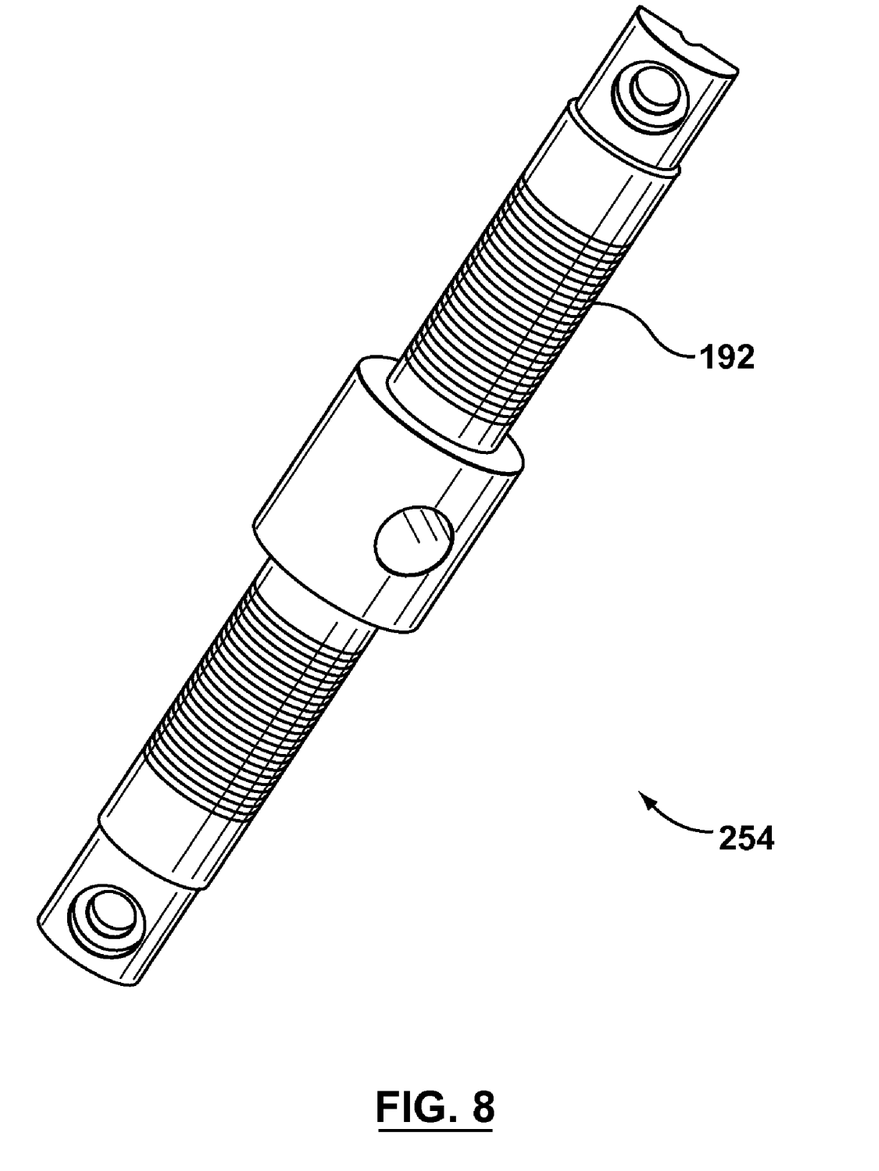
FIG. 8 shows a perspective view of a spool for a rotary valve assembly in accordance with a third non-limiting embodiment of the invention.

Referring now to FIG. 8, an additional embodiment of the invention is shown. A spool 254 is provided that includes a plurality of concentric grooves 192 across the surface area of each end portion 60. Depending on the viscosity of the molten material, the concentric grooves 192 can effect labyrinth sealing, further providing a pressure drop in the weeping molten material while also providing lubrication for spool rotation.

Figures 9, 10, 11:
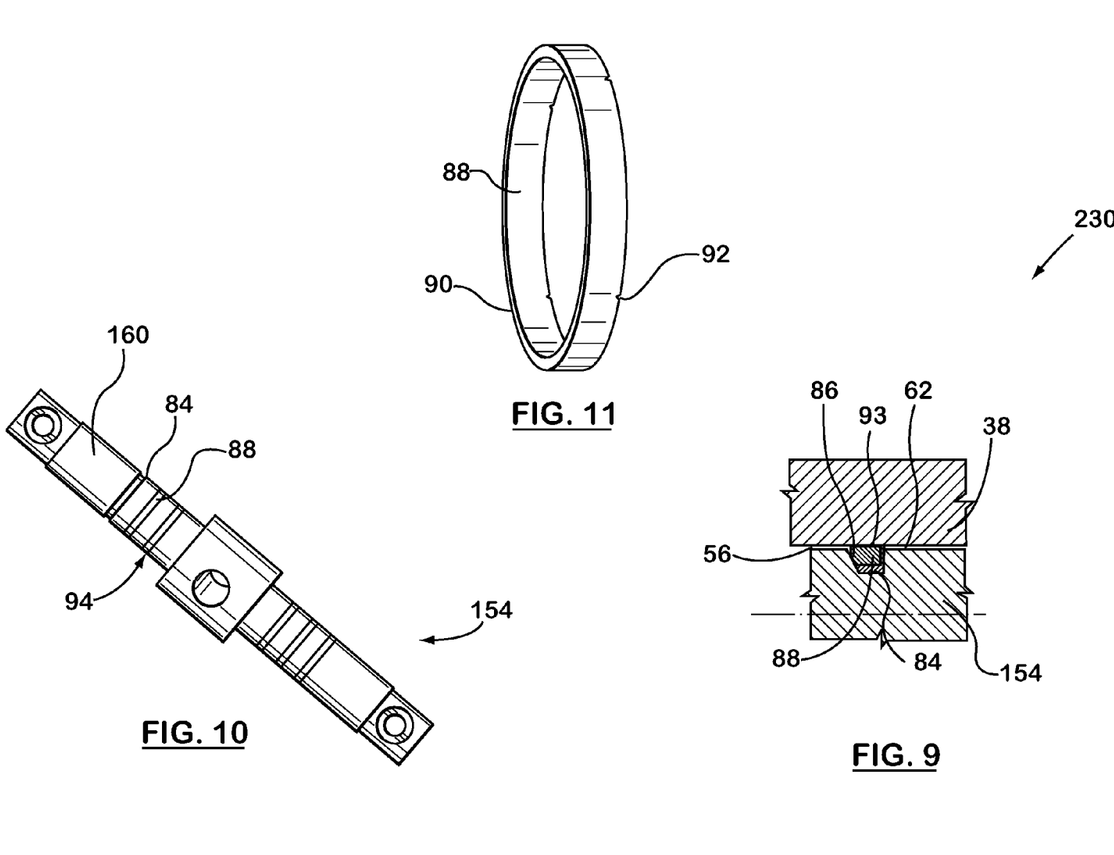
FIG. 9 shows a cross section of a portion of a rotary valve assembly in accordance with a fourth non-limiting embodiment of the invention.
FIG. 10 shows a perspective view of a spool for a the rotary valve assembly shown in FIG. 9.
FIG. 11 shows a perspective view of a piston ring for the rotary valve assembly shown in FIG. 9.

Referring now to FIG. 9-11, an additional non-limiting embodiment of the invention will be shown generally at 230. Rotary valve assembly 230 includes at least one wedge assembly 94 to reduce the clearance gap 62 around the spool 54 along at least one annular section between valve seat 36 and a spool 154. Each wedge assembly 94 includes at least one circumferential groove 84 and a piston ring 88 associated with each circumferential groove 84. The circumferential grooves 84 are distributed along the surface of end portions 160 of the spool 154, with each circumferential groove 84 having a sloped sidewall 86 on its outwards-facing edge (i.e., towards the nearest outside edges 56). Located within each circumferential groove 84 is one of the piston rings 88. Each piston ring 88 has a complementary tapered sidewall 90 that is complementary to the sloped sidewall 86 on the circumferential groove 84. Each piston ring 88 further has a spaced series of pressure grooves 92 opposite tapered sidewall 90. As the weeping molten material spreads along clearance gap 62 towards the outside edges 56, it begins to fill into the circumferential groove 84 via the pressure grooves 92 cut in piston ring 88. Piston ring 88 is stretched outwards to an adjacent surface 93 on the end cap 38 in a wedging action between sloped sidewall 86 and tapered sidewall 90, thereby reducing the clearance gap 62 between spool 154 and end cap 38 across the surface area of the piston ring 88. As the diminished clearance gap 62 only occurs across the surface area of piston ring 88 and only when the molten material is pressurized, the overall increase in rotational friction and in resin scorching across spool 154 is minimized. When the melt pressure acting on each piston ring 88 diminishes, each piston ring 88 recedes back into its circumferential groove 84, reducing rotational friction for spool 154 back towards its original operating state.

Figure 12:
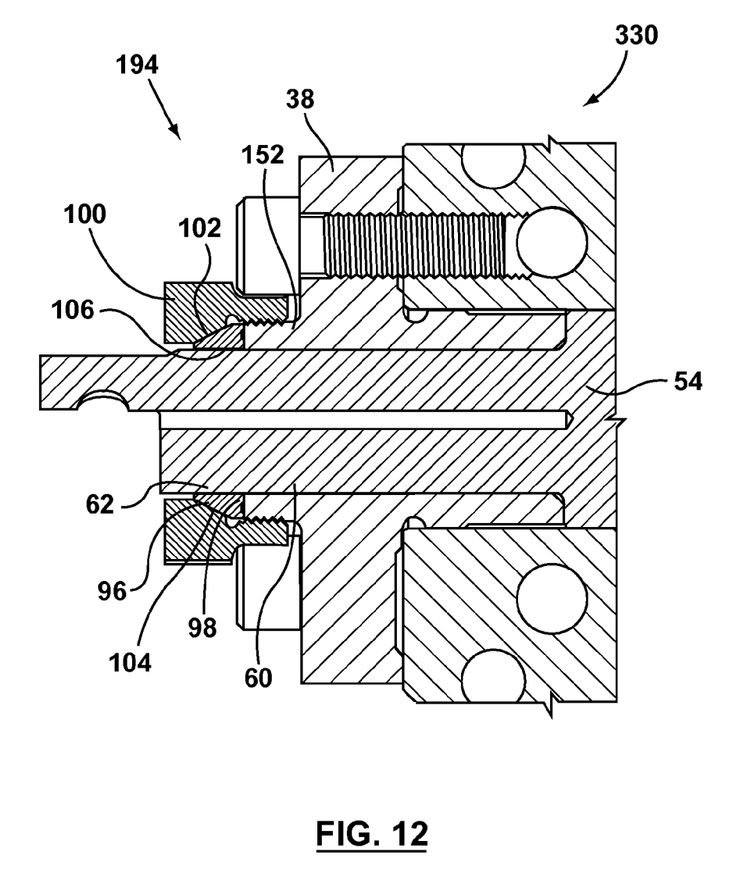
FIG. 12 shows a front cross-sectional view of a wedging assembly for a rotary valve assembly in accordance with a fifth non-limiting embodiment of the invention.

Referring now to FIG. 12, an additional non-limiting embodiment of the invention is shown generally at 330. Rotary valve assembly 330 includes at least one wedge assembly 194 to reduce the clearance gap 62 around the spool 54. Wedge assembly 194 includes a tapered ring 96 located on each end portion 60 adjacent an endwall 98 on end cap 38. A collet, namely threaded nut 100 is mounted onto complementary threads on extension portion 152 on end cap 38. Threaded nut 100 includes a complementary internal taper 102 opposing the taper 104 on tapered ring 96. Thus, by tightening threaded nut 100 around end cap 38, a wedging action between the mated tapered surfaces closes the clearance gap 62 between an inside surface 106 on tapered ring 96 and the adjacent part of end portion 60. As the reduced clearance gap 62 only occurs across the surface area of the tapered ring 96, the overall increase in rotational friction and in resin scorching across spool 54 is minimized. In addition, the threaded nut 100 can be loosened or tightened as need.

Figure 13:
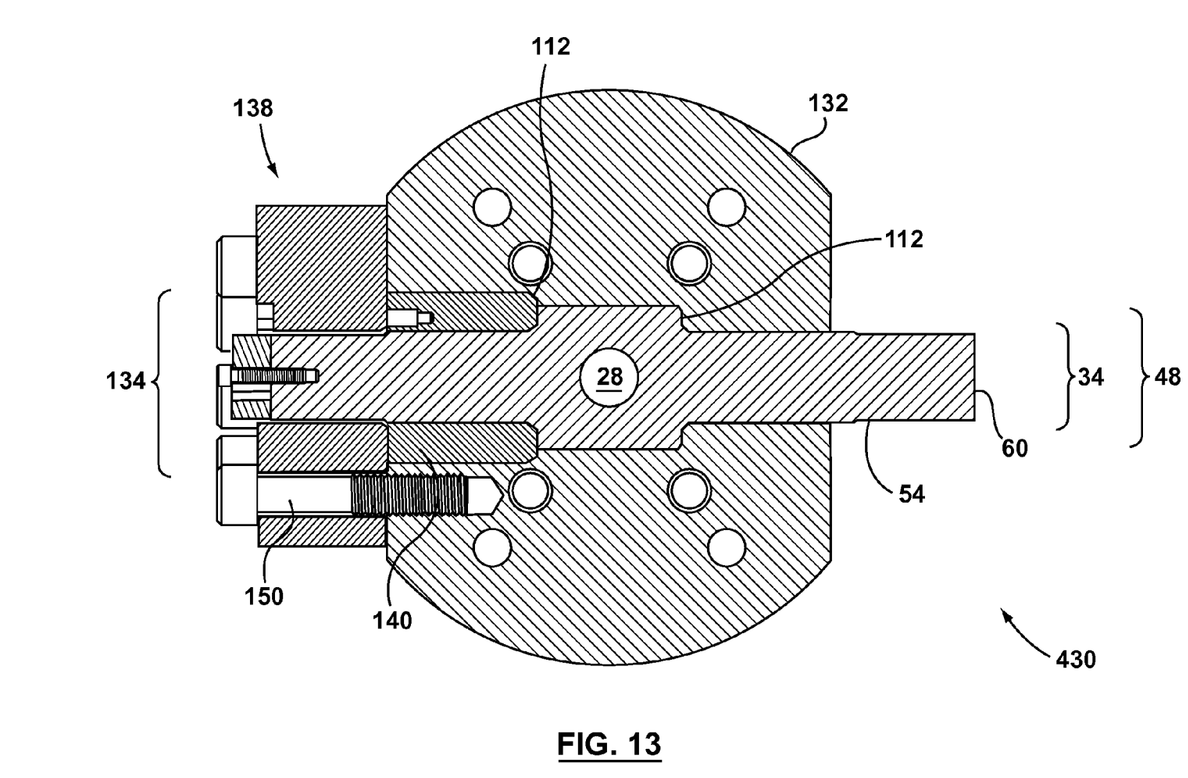
FIG. 13 shows a front cross-sectional view of a rotary valve assembly in accordance with a sixth non-limiting embodiment of the invention.

Referring now to FIG. 13, an additional non-limiting embodiment of the invention is shown generally at 430. Rotary valve assembly 430 includes a valve body 132 adapted to receive only a single end cap 138. On one side of melt channel 28, valve body 132 defines both outer bore 34 and inner bore 48. A step 112 is provided between outer bore 34 and inner bore 48. On the other side of melt channel 28, valve body 132 defines a peripheral bore 134 that is concentric with, but wider than outer bore 34. An insert portion 140 on end cap 138 is partially inserted into peripheral bore 134, which is mounted to valve body 132 by fasteners 150. The insert portion 140 defines inner bore 48 on the other side of melt channel 28, and further defines the step 112 on that side. While the presently-illustrated embodiment shows end cap 138 being machined as separate parts attached together, an integrally-formed end cap 138 is also within the scope of the invention.

To assemble rotary assembly 430, spool 54 is inserted into a valve body 132 after the end cap 138 is removed, with the leading end portion 60 slid through the inner bore 48. Once in place, the detached end cap 138 can be re-mounted, and secured tightly by fasteners 150. Spool 54 is fully constrained from non-rotational movement and cannot slip without loosening the end cap 138.

Figure 14:
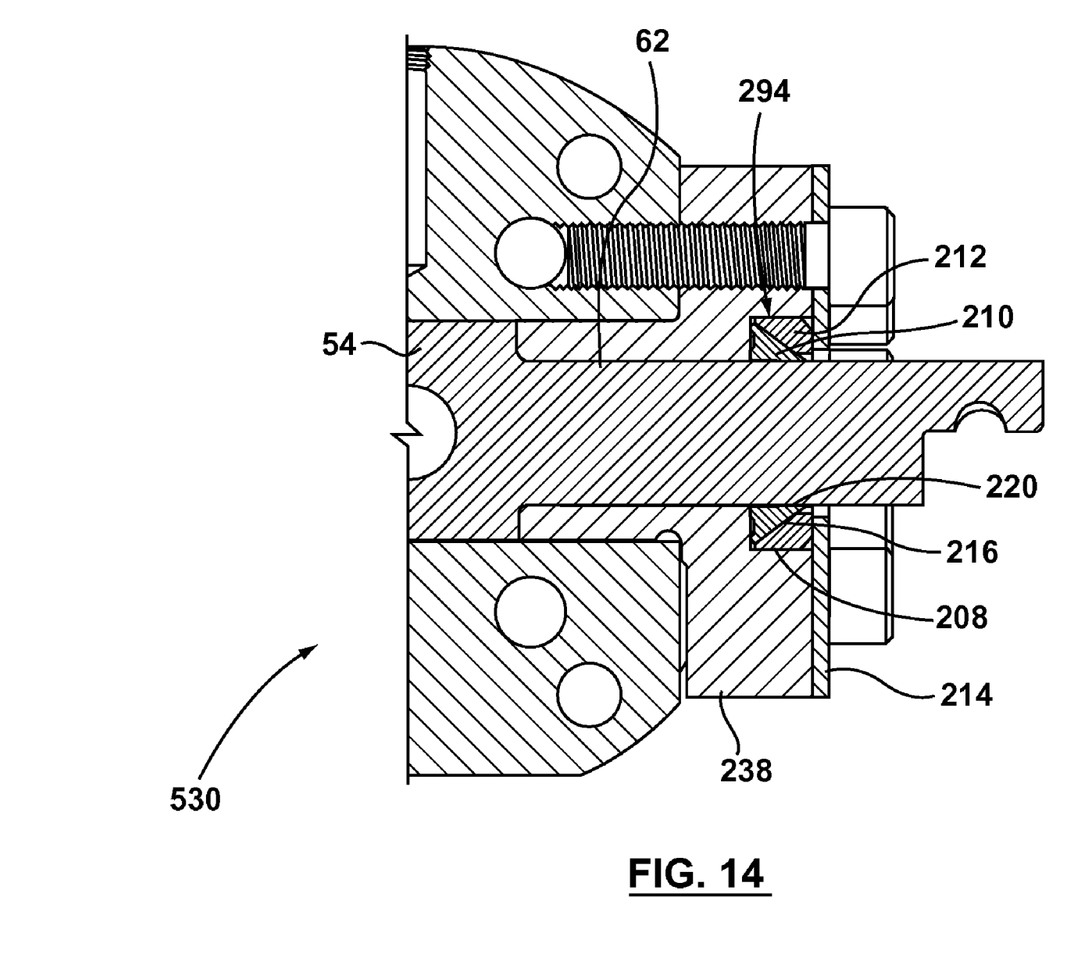
FIG. 14 shows a front cross-sectional view of a rotary valve assembly in accordance with a seventh non-limiting embodiment of the invention.

Referring now to FIG. 14, an additional non-limiting embodiment of the invention is shown generally at 530. A rotary valve assembly 530 is provided having a recessed region 208 is in one of the end caps 238. (While the presently-illustrated embodiment uses only a single end cap 238, two end caps 238 could also be used). A wedge assembly 294 is provided to further reduce leakage. Wedge assembly 294 includes a pair of tapered rings, namely an inner ring 210 and an outer ring 212 located within recessed region 208. A spring plate 214 retains the two rings 210 and 212 within recessed region 208. The two rings 210 and 212 are complementary to each other, and include opposing tapers 216. Weeping of the molten material along clearance gap 62 causes the inner ring 210 to slide away towards outer ring 212. The wedging action between inner ring 210 and outer ring 212 reduces clearance gap 62 between each ring and its adjacent surface 220 of end portion 60 or inner bore 48. As the reduced clearance gap 62 only occurs across the surface area of the two rings 210 and 212, the overall increase in operating friction and in resin scorching across spool 54 is minimized.

Non-limiting embodiments of the present invention may provide a rotary valve assembly having a reduced amount of leakage. Non-limiting embodiments of the present invention may provide a rotary valve assembly with a reduced amount of resin scorching. Non-limiting embodiments of the present invention may provide a rotary valve assembly having a reduced force requirement for actuation. Non-limiting embodiments of the present invention may provide a rotary valve assembly having a narrower shut-off head.

The description of the non-limiting embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the non-limiting embodiments, it will be apparent that modifications and enhancements are possible without departing from the concepts as described. Therefore, what is to be protected by way of letters patent are limited only by the scope of the following claims.

What is claimed is:

1. A rotary valve assembly for an injection unit, comprising
a valve body, defining a melt channel for a working fluid, and an outer bore, the outer bore bisecting the melt channel;
a pair of end caps, mounted on opposing sides of the valve body and defining insert portions which extend concentrically into the outer bore, the valve body and the pair of end caps cooperatively defining a valve seat intersecting the melt channel in a generally traverse direction, the valve seat having a wider portion defined by the outer bore, and a first narrower portion and a second narrower portion being defined by the insert portions; and
a spool, defining an orifice, the spool being rotatably mounted within the valve seat and located between the first narrower portion and the second narrower portion of the valve seat, and movable between an open position where the orifice is aligned with the melt channel for expression of the working fluid through the melt channel and a closed position where the orifice is misaligned with the melt channel to prevent the expression of the working fluid through the melt channel.

2. The rotary valve assembly of claim 1, wherein the insert portions are coaxially mounted within the wider portion, the wider portion being defined within the valve body.

3. The rotary valve assembly of claim 1, wherein the spool includes thinner portions seated within the first narrower portion and the second narrower portion of the valve seat, and a thicker portion seated within the wider portion of the valve seat.

4. The rotary valve assembly of claim 1, wherein the wider portion of the valve seat intersects the melt channel.

5. The rotary valve assembly of claim 1, wherein a clearance gap between the spool and the valve seat is reduced across at least one annular section along a length of the valve seat.

6. The rotary valve assembly of claim 5, wherein each of the at least one annular section is located on at least one of the first narrower portion and the second narrower portion.

7. The rotary valve assembly of claim 5, wherein the at least one annular section includes a plurality of concentric grooves on an exterior surface of at least one of the first narrower portion and the second narrower portion, adapted to provide labyrinth sealing.

8. The rotary valve assembly of claim 1, wherein a wedge assembly is located on the spool, and is operable to reduce the clearance gap across at least one annular section of the spool.

9. The rotary valve assembly of claim 8, wherein the wedge assembly includes at least one circumferential groove defined on the spool, and a piston ring is located within each of the at least one circumferential groove, the piston ring operable to engage against an adjacent surface of the valve seat when a force is applied to the piston ring by the working fluid leaking across the clearance gap.

10. The rotary valve assembly of claim 9, wherein each of the at least one circumferential groove includes a tapered sidewall on an outwards-facing edge, and each piston ring includes a complementary tapered sidewall for sliding action thereon.

11. The rotary valve assembly of claim 10, wherein each piston ring defines pressure grooves in a sidewall opposite the tapered sidewall.

12. The rotary valve assembly of claim 1, wherein a wedge assembly is located adjacent an outside edge of the valve seat, the wedge assembly operable to reduce a clearance gap between the spool and an inside surface of the wedge assembly.

13. The rotary valve assembly of claim 12, wherein the wedge assembly includes a tapered ring located adjacent to an outside edge of the valve seat and a collet having a complementary internal taper retaining the tapered ring adjacent to the outside edge of the valve seat.

14. The rotary valve assembly of claim 12, wherein a force applied to the wedge assembly by the working fluid to the wedge assembly reduces the clearance gap between the spool and the inside surface of the wedge assembly.

15. The rotary valve assembly of claim 14, wherein the wedge assembly includes a pair of tapered rings having opposing tapers located over the spool, the pair of tapered rings being retained by a sidewall of the end cap and a spring plate.

16. The rotary valve assembly of claim 1, wherein cooling elements are located proximate an outside edge of the valve seat.

17. The rotary valve assembly of claim 16, wherein the cooling elements includes a cooling channel operable to circulate a cooling medium.

18. The rotary valve assembly of claim 17, wherein the cooling elements include a heat sink.

19. The rotary valve assembly of claim 1, wherein heating elements are located on the valve body, the heating elements being located away from the first narrower portion and the second narrower portion of the valve seat.

20. A rotary valve assembly for an injection unit, comprising
a valve body, defining a melt channel for a working fluid, and an outer bore, the outer bore bisecting the melt channel;
an end cap mounted to the valve body and defining an insert portion which extends concentrically into the outer bore, the valve body and the end cap cooperatively defining a valve seat intersecting the melt channel in a generally traverse direction;
the valve seat having a wider portion defined by the outer bore, and a first narrower portion being defined at least in part by the insert portion, and a second narrower portion being defined within the valve body; and
a spool defining an orifice, the spool being rotatably mounted within the valve seat and located between the first narrower portion and the second narrower portion of the valve seat, and movable between an open position where the orifice is aligned with the melt channel for expression of the working fluid through the melt channel and a closed position where the orifice is misaligned with the melt channel to prevent the expression of the working fluid through the melt channel.

21. The rotary valve assembly of claim 20, wherein a clearance gap between the spool and the valve seat is reduced across at least one annular section along a length of the valve seat.

22. The rotary valve assembly of claim 21, wherein the at least one annular section includes a plurality of concentric grooves on an exterior surface of at least one of the first narrower portion and the second narrower portion, adapted to provide labyrinth sealing.

23. The rotary valve assembly of claim 21, wherein a wedge assembly is located on the spool, and is operable to reduce the clearance gap across at least one annular section of the spool.

* * * * *